US012710968B2

(12) United States Patent
Balasubramanian et al.

(10) Patent No.: US 12,710,968 B2
(45) Date of Patent: Aug. 18, 2026

(54) RULES BASED USER INTERFACE GENERATION

(71) Applicant: Microsoft Technology Licensing, LLC, Redmond, WA (US)

(72) Inventors: Ramrajprabu Balasubramanian, Sammamish, WA (US); Darren R. Davis, Woodinville, WA (US); Kenton A. Shipley, Woodinville, WA (US); Nathan T. Radebaugh, Wheaton, IL (US); Paul Dykstra, Issaquah, WA (US); Jan Harold Karachale, Sammamish, WA (US); Brian David Cross, Seattle, WA (US); Patrick J. Derks, Seattle, WA (US); William Scott Stauber, Seattle, WA (US); Nishad Mulye, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/463,806

(22) Filed: Sep. 8, 2023

(65) Prior Publication Data

US 2024/0143350 A1 May 2, 2024

Related U.S. Application Data

(63) Continuation of application No. 16/613,613, filed as application No. PCT/US2017/038032 on Jun. 16, 2017, now Pat. No. 11,809,217.

(51) Int. Cl.
*G06F 9/451* (2018.01)
*G06F 3/0484* (2022.01)

(52) U.S. Cl.
CPC ............ *G06F 9/451* (2018.02); *G06F 3/0484* (2013.01)

(58) Field of Classification Search
CPC ............................... G06F 9/451; G06F 3/0484
See application file for complete search history.

(56) References Cited

U.S. PATENT DOCUMENTS 8,209,408 B1 * 6/2012 Huang .................... G06F 9/543 715/771
8,972,977 B2 * 3/2015 Neil .................... G06F 9/45537 718/1
9,606,821 B2 * 3/2017 Robinson ............ H04L 63/0815
2003/0189597 A1 * 10/2003 Anderson ............ G06F 3/0481 715/778

(Continued)

OTHER PUBLICATIONS

Many VB instances for many projects, Oct. 25, 2010, retrieved from—https://forums.virtualbox.org/viewtopic.php?t=35627, 3 pages (Year: 2010).*

(Continued)

*Primary Examiner* — Yongjia Pan

(57) ABSTRACT

A system for generating a user interface described herein can include a processor to detect a type of the system based on hardware components residing within the system or coupled to the system and determine a user interface manager to execute based on the type of the system. The processor can also execute the user interface manager to generate a user interface for the system, wherein the type of the user interface manager comprises a plurality of rules to indicate a layout of the user interface.

20 Claims, 5 Drawing Sheets

(56) References Cited

U.S. PATENT DOCUMENTS

2005/0097506 A1* 5/2005 Heumesser .............. G07C 1/10 717/102
2006/0010433 A1* 1/2006 Neil .................... G06F 9/45533 717/138
2006/0259292 A1* 11/2006 Solomon ............. G06F 9/45537 703/27
2008/0229227 A1* 9/2008 Bantz ...................... G06F 9/451 715/771
2009/0221368 A1* 9/2009 Yen ....................... G06F 3/0304 463/32
2010/0050111 A1* 2/2010 Duffy .................... G06F 3/0484 715/764
2010/0186010 A1* 7/2010 Chalemin ............. G06F 9/5077 718/1
2010/0269060 A1* 10/2010 Bandholz .............. G06F 3/0481 715/778
2010/0293504 A1* 11/2010 Hachiya ................ G06F 3/1423 715/806
2010/0306771 A1* 12/2010 Kamay ............... G06F 9/45558 718/1
2011/0246904 A1* 10/2011 Pinto ....................... G06F 9/452 715/740
2011/0296488 A1* 12/2011 Dandekar ............... G06F 21/57 726/1
2012/0246647 A1* 9/2012 Ciano ................. G06F 9/45533 718/1
2013/0139153 A1* 5/2013 Shah ................... G06F 9/45558 718/1
2014/0123136 A1* 5/2014 Beda, III ............. G06F 16/144 718/1
2015/0346931 A1* 12/2015 Moran .................. G06F 9/5077 715/740
2015/0356773 A1* 12/2015 Kumar ................ G06F 9/45558 345/520
2016/0306531 A1* 10/2016 Wong ...................... G06F 9/451
2016/0364261 A1* 12/2016 Oh ...................... G06F 9/45558
2017/0351537 A1* 12/2017 AbiEzzi ................ H04L 67/025

OTHER PUBLICATIONS

Running many virtual machines on a single host, Sep. 30, 2008, retrieved from—https://stackoverflow.com/questions/154250/ running-many-virtual-machines-on-a-single-host, 7 pages (Year: 2008).*

KVM Virtualization and SteamOS—A guide, Mar. 10, 2014, retrieved from—https://steamcommunity.com/groups/steamuniverse/discussions/1/558749825189649359/?ctp=1, 8 pages (Year: 2014).*

Better Know A Console: Xbox One's HyperVisor OS, Jul. 1, 2013, retrieved from—https://gamrconnect.vgchartz.com/thread/163849/better-know-a-console-xbox-ones-hypervisor-os/1/, 1 page (Year: 2013).*

[Technical Long Read] How Hyper V coupled with XB1 Game and Windows OS actually works, Jul. 24, 2013, retrieved from—https://www.reddit.com/r/xboxone/comments/1j00qx/technical_long_read_how_hyper_v_coupled_with_xb1/?rdt=34364, 1 page (Year: 2013).*

Notice of Grant Received for Chinese Application No. 201780091953.5, mailed on Apr. 2, 2024, 05 pages (English Translation Provided).

Office Action Received for Canada Application No. 3063675, mailed on Feb. 14, 2024, 04 pages.

Office Action Received for Chinese Application No. 201780091953.5 Jan. 10, 2024, 7 pages (English Translation Provided).

Office Action Received for Canada Application No. 3063675, mailed on Sep. 13, 2024, 05 pages.

Notice of Allowance Received for Japanese Application No. 2019-561853, mailed on Dec. 14, 2021, 5 Pages. (English Translation Provided).

Notice of Allowance Received for South Africa Application No. 2019/07550, mailed on Apr. 14, 2021 1 Page.

* cited by examiner

200

300

RULES BASED USER INTERFACE GENERATION

CROSS-REFERENCE TO RELATED APPLICATIONS

This application is a continuation of U.S. patent application Ser. No. 16/613,613 filed Nov. 19, 2019, which is a National Stage of PCT/US2017/038032 filed Jun. 16, 2017 and which applications are herein incorporated by reference in their entireties. To the extent appropriate a claim of priority is made to each of the above mentioned applications.

BACKGROUND

Computer devices of any size can generate a user experience, which is typically fixed to the intended design. Each device can separately generate a user interface based on fixed application functions. For example, each device can separately generate a user interface by hard coding or using a fixed format for displaying applications.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

An embodiment described herein includes a system for generating a user interface that includes a processor to detect a type of the system based on hardware components residing within the system or coupled to the system. The processor can also determine a user interface manager to execute based on the type of the system and execute the user interface manager to generate a user interface for the system, wherein the user interface manager comprises a plurality of rules to indicate a layout of the user interface.

In another embodiment described herein, a method for generating a user interface can include detecting a type of a system based on hardware components residing within the system or coupled to the system. The method can also include determining a user interface manager to execute based on the type of the system and executing the user interface manager to generate a user interface for the system, wherein the user interface manager comprises a plurality of rules to indicate a layout of the user interface.

In yet another embodiment described herein, a system for generating a user interface can include a processor and a storage device to store a plurality of instructions that, in response to being executed by the processor, cause the processor to detect a type of the system based on hardware components residing within the system or coupled to the system and select a user interface manager from a visual tree of user interface managers to execute based on the type of the system, wherein the visual tree is to reside in a user interface host. The plurality of instructions can also cause the processor to execute the selected user interface manager to generate a user interface for the system, wherein the selected user interface manager comprises a plurality of rules to indicate a layout of the user interface.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

DETAILED DESCRIPTION

User interfaces can be generated using various static, non-reusable techniques. For example, user interfaces for different devices can be generated using different sets of functions, different data paths, and different visual compositions. Accordingly, applications often include different code to generate a user interface for each type of device. These applications also have deep context about the device on which they are running and often map user interface controls directly to pixel coordinates on a display device. For example, the applications may specify pixel coordinates to display a user control element such as a text field, among others.

Techniques described herein provide a system for generating a user interface based on rules. In some examples, the rules can correspond to a particular type of device. For example, the rules for generating a user interface for a desktop computing device can differ from the rules for generating a user interface for a mobile device. In some embodiments, a system can detect a type of the system based on hardware components residing within the system and determine a type of user interface manager to execute based on the type of the system. The system can also execute the user interface manager to generate a user interface for the system, wherein the user interface manager comprises a plurality of rules to indicate a layout of the user interface.

The techniques described herein enable code for generating user interfaces to be shared while creating user interfaces for any number of different devices. For example, the techniques described herein can enable shared code to generate a user interface for a desktop device, a tablet device, a mobile device, a phone device, a gaming console device, and an augmented reality device, among others. The shared code can generate different user interfaces based on rules corresponding to each type of device. For example, code for displaying a user application with certain rules can be shared between any number of different user interface managers corresponding to different types of devices.

Figure 1:
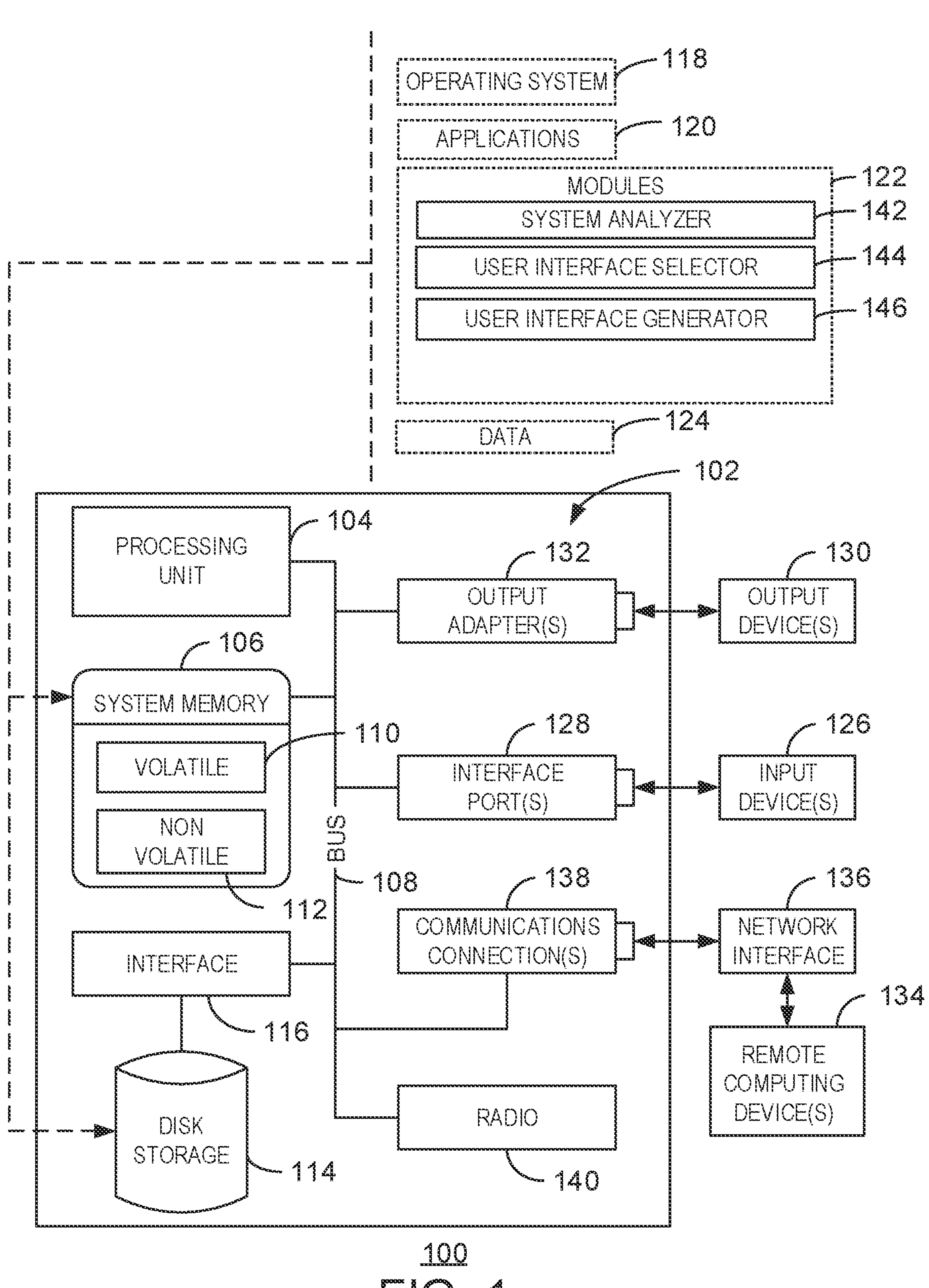
FIG. 1 is a block diagram of an example of a computing system that can generate a user interface based on rules.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1 discussed below, provide details regarding different systems that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

FIG. 1 is a block diagram of an example of a computing system that can generate a user interface based on rules. The example system 100 includes a computing device 102. The computing device 102 includes a processing unit 104, a system memory 106, and a system bus 108. In some examples, the computing device 102 can be a gaming console, a personal computer (PC), an accessory console, a gaming controller, among other computing devices. In some examples, the computing device 102 can be a node in a cloud network.

The system bus 108 couples system components including, but not limited to, the system memory 106 to the processing unit 104. The processing unit 104 can be any of various available processors. Dual microprocessors and other multiprocessor architectures also can be employed as the processing unit 104.

The system bus 108 can be any of several types of bus structure, including the memory bus or memory controller, a peripheral bus or external bus, and a local bus using any variety of available bus architectures known to those of ordinary skill in the art. The system memory 106 includes computer-readable storage media that includes volatile memory 110 and nonvolatile memory 112.

In some embodiments, a unified extensible firmware interface (UEFI) manager or a basic input/output system (BIOS), containing the basic routines to transfer information between elements within the computer 102, such as during start-up, is stored in nonvolatile memory 112. By way of illustration, and not limitation, nonvolatile memory 112 can include read-only memory (ROM), programmable ROM (PROM), electrically programmable ROM (EPROM), electrically erasable programmable ROM (EEPROM), or flash memory.

Volatile memory 110 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 102 also includes other computer-readable media, such as removable/non-removable, volatile/non-volatile computer storage media. FIG. 1 shows, for example a disk storage 114. Disk storage 114 includes, but is not limited to, devices like a magnetic disk drive, floppy disk drive, tape drive, Jaz drive, Zip drive, LS-210 drive, flash memory card, or memory stick.

In addition, disk storage 114 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 114 to the system bus 108, a removable or non-removable interface is typically used such as interface 116.

It is to be appreciated that FIG. 1 describes software that acts as an intermediary between users and the basic computer resources described in the suitable operating environment 100. Such software includes an operating system 118. Operating system 118, which can be stored on disk storage 114, acts to control and allocate resources of the computer 102.

System applications 120 take advantage of the management of resources by operating system 118 through program modules 122 and program data 124 stored either in system memory 106 or on disk storage 114. It is to be appreciated that the disclosed subject matter can be implemented with various operating systems or combinations of operating systems.

A user enters commands or information into the computer 102 through input devices 126. Input devices 126 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, any suitable dial accessory (physical or virtual), and the like. In some examples, an input device can include Natural User Interface (NUI) devices. NUI refers to any interface technology that enables a user to interact with a device in a "natural" manner, free from artificial constraints imposed by input devices such as mice, keyboards, remote controls, and the like. In some examples, NUI devices include devices relying on speech recognition, touch and stylus recognition, gesture recognition both on screen and adjacent to the screen, air gestures, head and eye tracking, voice and speech, vision, touch, gestures, and machine intelligence. For example, NUI devices can include touch sensitive displays, voice and speech recognition, intention and goal understanding, and motion gesture detection using depth cameras such as stereoscopic camera systems, infrared camera systems, RGB camera systems and combinations of these. NUI devices can also include motion gesture detection using accelerometers or gyroscopes, facial recognition, three-dimensional (3D) displays, head, eye, and gaze tracking, immersive augmented reality and virtual reality systems, all of which provide a more natural interface. NUI devices can also include technologies for sensing brain activity using electric field sensing electrodes. For example, a NUI device may use Electroencephalography (EEG) and related methods to detect electrical activity of the brain. The input devices 126 connect to the processing unit 104 through the system bus 108 via interface ports 128. Interface ports 128 include, for example, a serial port, a parallel port, a game port, and a universal serial bus (USB).

Output devices 130 use some of the same type of ports as input devices 126. Thus, for example, a USB port may be used to provide input to the computer 102 and to output information from computer 102 to an output device 130.

Output adapter 132 is provided to illustrate that there are some output devices 130 like monitors, speakers, and printers, among other output devices 130, which are accessible via adapters. The output adapters 132 include, by way of illustration and not limitation, video and sound cards that provide a means of connection between the output device 130 and the system bus 108. It can be noted that other devices and systems of devices provide both input and output capabilities such as remote computing devices 134.

The computer 102 can be a server hosting various software applications in a networked environment using logical connections to one or more remote computers, such as remote computing devices 134. The remote computing devices 134 may be client systems configured with web browsers, PC applications, mobile phone applications, and the like. The remote computing devices 134 can be a personal computer, a server, a router, a network PC, a workstation, a microprocessor based appliance, a mobile phone, a peer device or other common network node and the like, and typically includes many or all of the elements described relative to the computer 102.

Remote computing devices 134 can be logically connected to the computer 102 through a network interface 136 and then connected via a communication connection 138, which may be wireless. Network interface 136 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection 138 refers to the hardware/software employed to connect the network interface 136 to the bus 108. While communication connection 138 is shown for illustrative clarity inside computer 102, it can also be external to the computer 102. The hardware/software for connection to the network interface 136 may include, for exemplary purposes, internal and external technologies such as, mobile phone switches, modems including regular telephone grade modems, cable modems and DSL modems, ISDN adapters, and Ethernet cards.

The computer 102 can further include a radio 140. For example, the radio 140 can be a wireless local area network radio that may operate one or more wireless bands. For example, the radio 140 can operate on the industrial, scientific, and medical (ISM) radio band at 2.4 GHz or 5 GHz. In some examples, the radio 140 can operate on any suitable radio band at any radio frequency.

The computer 102 includes one or more modules 122, such as a system analyzer 142, a user interface selector 144, and a user interface generator 146. In some embodiments, the system analyzer 142 can detect a type of the system based on hardware components residing within the system or coupled to the system. For example, devices including display screens below a threshold size can be identified as mobile devices or devices coupled to gaming controllers can be identified as gaming consoles. In some embodiments, the user interface selector 144 can determine a type of user interface manager to execute based on the type of the system. In some examples, each type of device can be associated with a separate user interface manager. A user interface manager, as referred to herein, can include any suitable application that can generate a visual appearance for an operating system. In some embodiments, the user interface generator 146 can execute the user interface manager to generate a user interface for the system, wherein the type of the user interface manager comprises a plurality of rules to indicate a layout of the user interface. A layout, as referred to herein, can include a two dimensional representation of visible applications and system controls. The plurality of rules can include whether application windows can be overlapped, whether applications can be visible in a full screen mode, or a location on a display screen corresponding to various operating system menus and functions, among others. It is appreciated that the set of rules may also define a 3D user experience or even a non-visual user experience such as an audio only experience.

It is to be understood that the block diagram of FIG. 1 is not intended to indicate that the computing system 102 is to include all of the components shown in FIG. 1. Rather, the computing system 102 can include fewer or additional components not illustrated in FIG. 1 (e.g., additional applications, additional modules, additional memory devices, additional network interfaces, etc.). Furthermore, any of the functionalities of the system analyzer 142, user interface selector 144, and user interface generator 146 may be partially, or entirely, implemented in hardware and/or in the processing unit (also referred to herein as a processor) 104. For example, the functionality may be implemented with an application specific integrated circuit, in logic implemented in the processing unit 104, or in any other device.

Figure 2:
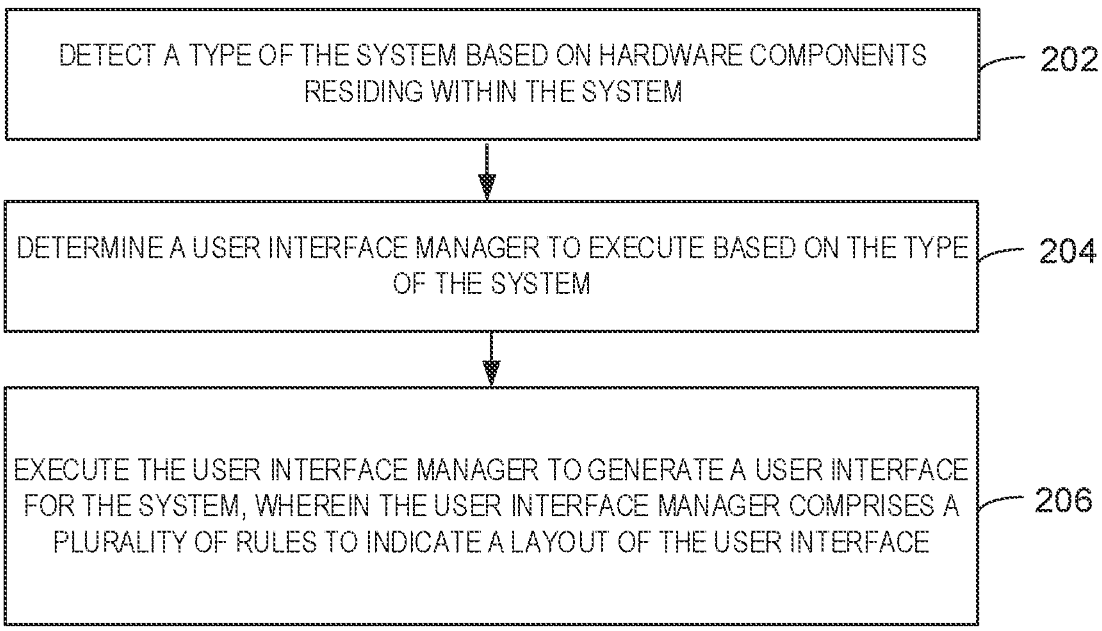
FIG. 2 is a process flow diagram of an example method for generating a user interface based on rules.

FIG. 2 is a process flow diagram of an example method for generating a user interface based on rules. The method 200 can be implemented with any suitable computing device, such as the computing system 102 of FIG. 1.

At block 202, a system analyzer 142 can detect a type of a system based on hardware components residing within the system or coupled to the system. For example, the type of the system can include an augmented reality device, a tablet device, a mobile device, a phone device, a gaming console device, or a desktop device, among others. In some embodiments, the system analyzer 142 can detect the type of the system based on any suitable hardware components such as a display screen, a processor, a graphics processor, a cellular radio, and the like. In some examples, the system analyzer 142 can determine that a system that includes a cellular radio is a phone device. In some embodiments, the system analyzer 142 can determine a type of the device based on a size of the display screen of the device. For example, devices that include a display screen that is smaller than a predetermined threshold size can be identified as mobile devices. In some embodiments, the system analyzer 142 can determine that devices that support three dimensional user interfaces are augmented reality devices and devices that connect to gaming controllers are gaming console devices. In some embodiments, the system analyzer 142 can detect a device type based on other hardware components such as power sources, graphics processors, memory devices, and the like. In each of these embodiments, system analyzer 142 can use a combination of predetermined conditions, such as the presence of a specific combination of modules 122 used for a mobile device or a different combination of modules 122 used for a desktop device, as well as the heuristics called out here to make a final determination of the type and configuration of the current system.

At block 204, a user interface selector 144 can determine a user interface manager to execute based on the type of the system. In some embodiments, the user interface managers (also referred to herein as composers) can generate a user interface based on the type of a system. For example, a user interface may enable overlapping windows on desktop devices, but not on mobile devices. Additionally, the user interface managers may include application switchers including a link to a digital assistant along with icons corresponding to applications that are being executed, among other features. The user interface selector 144 can determine the user interface manager to execute to produce a user experience corresponding to a device. In some embodiments, each type of device is associated with a particular user interface manager. For example, an augmented reality device may have a first user interface manager and a gaming console device may have a second user interface manager. As discussed in greater detail below, each user interface manager can indicate how a user interface is to be generated for applications being executed.

At block 206, a user interface generator 146 can execute the user interface manager to generate a user interface for the system, wherein the type of the user interface manager comprises a plurality of rules to indicate a layout of the user interface. The plurality of rules can indicate how to display applications being executed and other visual elements such as an application launcher, an application switcher, and a window list, among others, which may or may not be an independent application or a collection of user manager rules defining how to show, for example, a clock. An application launcher, as referred to herein, can include a list of executable applications installed on a system, a list of recently accessed applications installed on the system, recommended applications to be installed on the system, and the like. In some examples, the application launcher can include commands that can access programs, documents, and settings. These commands can include a search function based on locally stored applications and files, a list of documents available locally on a device or on a remote server, a control panel to configure components of a device, power function commands to alter the power state of the device, and the like. An application switcher, as referred to herein, can include a link to a digital assistant, a task view illustrating all open applications, a set of icons corresponding to applications being executed, and various icons corresponding to applications and hardware features that are enabled each time a device receives power.

In some embodiments, the plurality of rules can indicate an area of a screen that is to be occupied by the application launcher, application switcher, and windows corresponding to applications that are being executed. The plurality of rules may not rely on pixel to pixel mappings by the applications being executed. For example, user interface controls can be displayed in regions of a display screen based on the rules. In some examples, a text field may be displayed in the center of an application and the location of the text field can be determined by the user interface generator 146 based on the plurality of rules. For example, the location of the text field may depend upon whether application windows are overlapping one another, if more than one application window is visible, and the like. The location of user interface controls can also be adjusted based on a size and location of the application switcher. For example, the application switcher can be displayed along the top, bottom, left side, or right side of a display screen. Each type of user interface manager can determine a location of application windows in relation to the location of the application switcher. In some embodiments, the user interface generator 146 can display the user interface based on at least one display characteristic corresponding to the user interface manager. For example, a user interface manager for gaming console devices may display applications in a full screen mode with no frame or adornments. In some embodiments, the user interface manager 146 can also display an application switcher and desktop background. An application switcher, as described in greater detail below, can include any number of icons corresponding to hardware control applications, executing application, digital assistants, and the like. The desktop background can include any suitable image, any number of links to locally stored files, links to directories, and the like.

It is appreciated that user interface concepts such as an application launcher, application switcher, window adornments, action centers, and other instances of user interface experiences mentioned herein are exemplary in nature. The plurality of rules presented to user interface generator 146 may create any user experience desired. There is also no limitations on the complexity of such rules. Some rules may simply indicate when and how an element of text is to be placed on the screen while other rules may define a multi-stage 3D experience with numerous potential outcomes.

In one embodiment, the process flow diagram of FIG. 2 is intended to indicate that the blocks of the method 200 are to be executed in a particular order. Alternatively, in other embodiments, the blocks of the method 200 can be executed in any suitable order and any suitable number of the blocks of the method 200 can be included. Further, any number of additional blocks may be included within the method 200, depending on the specific application. In some embodiments, the method 200 can include detecting that a system or device shifts from a first type of a device to a second type of device. For example, a mobile device may be inserted into a docking station that provides a larger display screen. The user interface generator 146 can detect a change to the available hardware resources of the mobile device and generate a desktop based user interface to replace a mobile device based user interface. In some embodiments, the method 200 can also include detecting that an external monitor is coupled to a mobile device or a phone device. The user interface manager 146 can generate a separate user interface based on a desktop user interface if the size of the external monitor exceeds a predetermined threshold.

In some embodiments, the method 200 can include generating a user interface that includes at least one active application and at least one visible application. An active application can indicate an application accepting user input, while a visible application can be displayed but not accepting user input. In some embodiments, the method 200 can also include executing a second user interface manager, wherein the second user interface manager is to execute an action center and a notifications detector application. In some embodiments, the method 200 can also include managing at least two subordinate user interface managers, wherein each of the at least two subordinate user interface managers is to execute a separate application.

In some embodiments, the method 200 can also include detecting that an input device is coupled to a system and generating a new user interface manager based on the input device, wherein the input device is a gaming controller and the new user interface manager is to provide a gaming console user interface. Additionally, the method 200 can include storing a state of the user interface in response to transitioning from the user interface manager to the new user interface manager.

In some embodiments, a user interface manager can be implemented with various configurations. For example, the user interface manager can be implemented with an executed application that includes visuals and adornments, a persistent user interface in a main thread of a user interface manager, a persistent user interface in a non-main thread of a user interface manager, as a hosted shell experience for out of process applications, or a recursively composed user interface manager, among others. The various configurations of the user interface manager are illustrated and described below in relation to FIG. 3.

Figure 3:
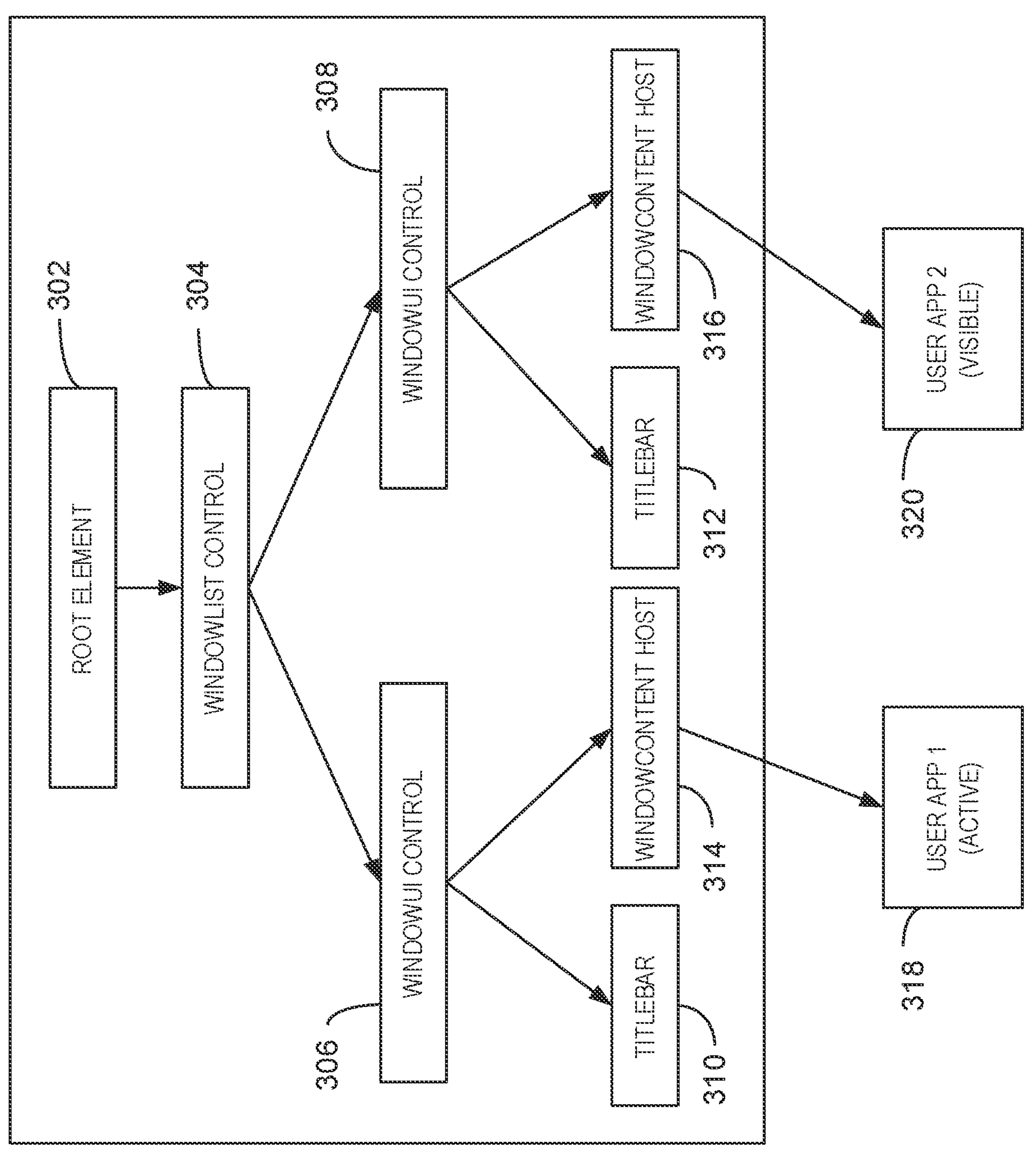
FIG. 3 is a block diagram of an example system that can generate a user interface for multiple user applications based on rules.

FIG. 3 is a block diagram of an example system that can generate a user interface for multiple user applications based on rules. Rules may be represented as high level concepts, such as display a block of text in the center of a region, or low-level concepts, such as those which require the rule author to determine the size of a region and mathematically center the text in the region. The user interface manager 300 can be executed with any suitable number of applications and software components. For example, the user interface 300 manager can use Windows.UI.Composition or Extensible Application Markup Language (XAML) to imperatively or declaratively describe various rules which results in the creation of a user interface or shell starting at the root of the visual tree 302. In other embodiments, user interface manager 300 may use any available technologies such as HTML in any of its various forms, OpenGL, Vulkan, Collada, or other existing user experience frameworks to define and manage the way in which user experience rules are converted to generate visual trees which describe on-screen experiences. The user interface manager 300 is also enabled to use these rules for composing visuals that are running outside of a process such as in other shell component applications or other the top level visuals of other application experiences. In some embodiments, the user interface manager 300 can implement a specific user interface or shell experience by composing different smaller common components of the shell together in a way that reflects the overall shell experience. Also, the user interface manager 300 can configure a component's properties to realize a particular shell experience based on system analyzer 142.

In some embodiments, the user interface manager 300 can communicate with an underlying shell or user interface through a set of private application programming interfaces (APIs). These private APIs can allow the user interface manager to execute instructions corresponding to shell tasks associated with a shell. The shell task can include application activation and lifetime management, application or process locks, application resizing, application visibility changes, shutdown, and other shell features. In some embodiments, the user interface manager 300 can also reflect a current state of a shell. The state of a shell can include the active view, running applications, current screen resolution and other shell state information.

In some embodiments, the user interface manager 300 can present the visuals of user applications to the user in additional to the shell experience. These applications can paint into a buffer (represented by a DCOMP visual surface or other similar technology) using the framework of the application's choice. In such examples, the buffer does not paint to screen directly and by default does not get on screen by itself. Rather, the user interface manager 300 can select the visuals for an application and display the application. In some embodiments, the user interface manager 300 can also add adornments, such as a title bar or drop shadow, on the top level visual of a user application. In some embodiments, the user interface manager 300 can also indicate any per application window content such as splash screens, among others.

In one example, a user interface manager 300 can communicate with a Windows List Control 304 function to provide a list of applications being executed on a system. Based on the user interface rules applied by user interface manager 300 each application in the list can be associated with a windows user interface control 306 or 308, which is also associated with a title bar 310 or 312 and a windows content host 314 or 316. The resulting user interface rules enable, for example, a window that is dragged to have the contents of the window also moved because the render transform for the move is applied to the child visual that happens to be the application's composition visual in a coordinated fashion. In the example of FIG. 3, windows control host 314 displays an active user application 1 318 and windows control host 316 display a visible user application 2 320. Differences in visual representation between title bar 310 wrapping active application 318 and title bar 312 wrapping active application 320 are also indicated and managed through user interface rules processed by user interface generator 146. The user interface manager 300 can indicate if user application 1 318 and user application 2 320 can be overlapped, viewed side by side, resized, and the like.

It is to be understood that the block diagram of FIG. 3 is not intended to indicate that the user interface manager 300 is to create a visual representation containing all of the components shown in FIG. 3. Rather, the user interface manager 300 can cause the visual tree to include fewer or additional components not illustrated in FIG. 3 (e.g., additional applications, additional modules, additional experiences, etc.).

Figure 4:
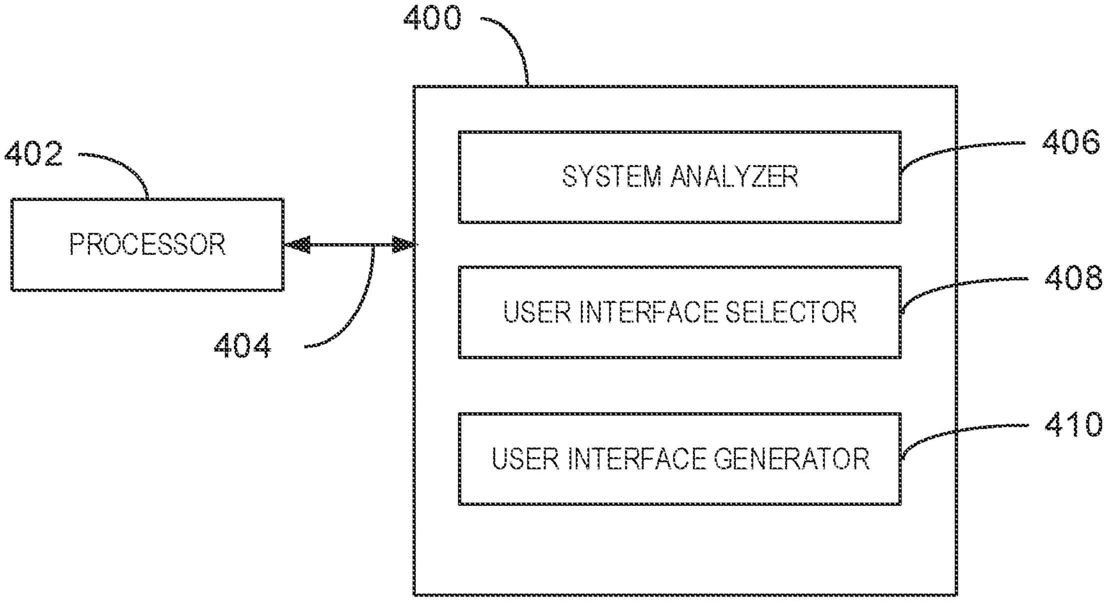
FIG. 4 is a block diagram of an example computer-readable storage media that can generate a user interface based on rules.

FIG. 4 is a block diagram of an example computer-readable storage media that can generate a user interface based on rules. The tangible, computer-readable storage media 400 may be accessed by a processor 402 over a computer bus 404. Furthermore, the tangible, computer-readable storage media 400 may include code to direct the processor 402 to perform the steps of the current method.

The various software components discussed herein may be stored on the tangible, computer-readable storage media 400, as indicated in FIG. 4. For example, the tangible computer-readable storage media 400 can include a system analyzer 406 that can detect a type of the system based on hardware and software components residing within the system. In some embodiments, a user interface selector 408 can determine a user interface manager to execute based on the type of the system. In some embodiments, a user interface generator 410 can execute the type of the user interface manager to generate a user interface for the system, wherein the type of the user interface manager comprises a plurality of rules to indicate a layout of the user interface.

It is to be understood that any number of additional software components not shown in FIG. 4 may be included within the tangible, computer-readable storage media 400, depending on the specific application.

Figure 5:
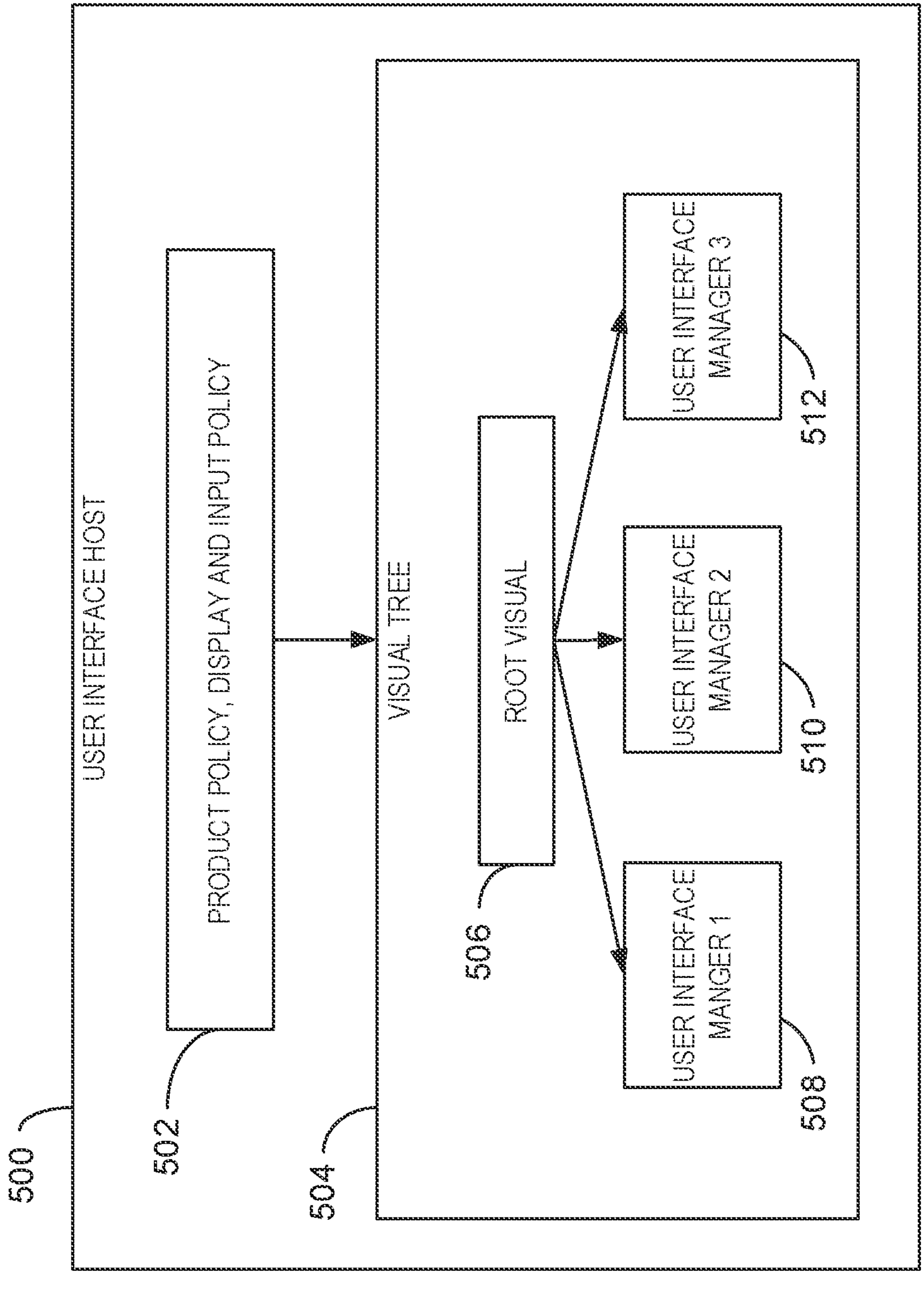
FIG. 5 is a block diagram of an example system for hosting user interface managers within a user interface manager.

FIG. 5 is a block diagram of an example system for hosting user interface managers within a user interface manager. In some embodiments, multiple user interface managers can be active at the same time and a system can morph between one or more of these user interface managers based on a state of the system and any number of rules. In some examples, user interface managers can also be expressed in a simultaneous fashion, where multiple user interface managers are used in an independent way from one another. For example, a user interface for a device, such as a desktop PC, can morph to and from a tablet mode in a more efficient way. In some examples, there is a global data model and a view model which understands and represents the elements being hosted in these experiences so that morphing is possible.

As illustrated in FIG. 5, a user interface host 500 can include rules such as product policy, and display and input policy 502 which can be used and interpreted by system analyzer 142 to determine a user interface manager to execute based on the type of system. The user interface host 500 can generate a visual tree 504 based on the product policy, display and input policy 502, and a state of a system. The visual tree 504 can include a root visual 506, user interface manager 1 508, user interface manager 2 510, and user interface manager 3 512. Depending on the rules and the state of the system, either user interface manager 1 508, user interface manager 2 510, or user interface manager 3 512 can be used to generate a user interface. Alternate embodiments exist where user interface host 500 creates a plurality of visual roots each with one or more user interface managers or scenarios in which user interface managers may themselves encapsulate other user interface managers.

In one embodiment, user interface host 500 in FIG. 5 could represent a user interface host capable of presenting a user experience for a 2-in-1 portable computer. With a keyboard attached and active such a device behaves as a traditional laptop computer while with the keyboard removed the same device behaves more like a tablet computer. User interface host 500 uses system analyzer 406 to determine, among other things, when the keyboard is active or not. When User interface host 500 determines that the keyboard is active, it enables user interface manager 508. As described previously user interface manager 508 uses a plurality of rules in conjunction with user interface generator 410 to create a user experience which is appropriate for the user of a laptop computer. Such a user experience might include the use of overlapping windows for applications and user experiences which are optimized for mouse and keyboard usage among others.

At a later point in time a user may do an action, such as detaching the keyboard, which causes system analyzer 406 to recognize that the keyboard is no longer active and user interface host 500 to determine that user interface manager 508 is no longer the correct experience to present to the user. Through the capabilities described here, user interface host 500 is enabled to cause user manager 508 to morph into user manager 510 which expresses a more tablet appropriate experience without impacting the user's ability to interact with the system. A tablet mode experience might replace the use of overlapping windows with a single full screen experience and user experiences which are optimized for touch usage among others. The process of morphing, as referred here in, implies a seamless visual transition from one visual state of the system to another visual state using animation techniques and the like all while maintaining the ability of componentized visual elements such as title bar 310 or title bar 312 to support user input or do other tasks. In one such embodiment, this is achieved by having a centralized repository of information about the state of top level application visuals and other key visual components being presented throughout the system. This state preserved in this repository is independent of the rules and information used by each user interface manager to present these top level application visuals and other elements. Part of this state information in the repository is the association which exists between these visual elements and the user interface manager responsible for presenting them on screen. When system analyzer 406 determines that the keyboard is no longer active and user interface host 500 responds by indicating that user interface manager 508 is to be replaced by user interface manager 510 the combination of information in this state repository and the loose coupling with user interface managers enable a quick and efficient replacement of user interface manager 508 with user interface manage 510. In addition, the use of user interface generator 410 to interpret rules for animation and other behaviors at the same time provides a seamless transition of visuals and input from user interface manager 508 to user interface manager 510. It is appreciated that the methods and technologies called out here, such as the use of a common state repository for top level application visuals, are examples only and other embodiments may employ different approaches and combinations of hardware and software to achieve similar effects.

In an alternate embodiment user interface host 500 is enabled to create environments in which user interface managers are recursively embedded in each other. Consider a traditional desktop computer which uses overlapping windows and includes a virtual desktop paradigm. Virtual desktops are a feature of many modern operating system user experiences which enables a user to create alternate desktops. The user is then able to switch between each of these desktops as a way to segregate different tasks. For example, a user may use one desktop for managing work related applications related to one project, a different desktop for managing work related applications for a separate project, and a different desktop for managing applications related to their personal life. Often such virtual desktop implementations allow for applying different customizations, such as a desktop background, on each virtual desktop. In some examples, they are mutually exclusive—meaning you cannot see both the work virtual desktop and personal virtual desktop at the same time. Returning to FIG. 5 and user interface host 500 consider that each instance of user interface manager 508, 510, and 512 is configured by user interface generator 410 with the appropriate set of rules to express a desktop experience. Assume that user interface manager 508 is then associated by the user with applications for the first work project, user interface manager 510 for the second work project, and user interface manager 512 for the third work project. Using techniques like those described in the previous example it is possible for user interface host 500 to use user feedback provided through system analyzer 406 to present the appropriate user interface managers 508, 510, or 512 depending on user choice. This functionality matches virtual desktop implementations.

In one embodiment, the fact that user interface manager 510 is an independent instance of the desktop experience, which itself is separated from user interface manager 508 and 512, allows for the user to simultaneously present any combination of user interface managers 508, 510, and 512 to the user. This enables, for example, a user to show and interact with both user interface manager 508 and user interface manager 510 simultaneously allowing the user to interact with both desktop experiences at the same time. One such embodiment of this experience allows for hosting user manager 510 inside of user manager 508 as a separate overlapped window. Similarly, user interface manager 512 containing personal information could be hosted in a window by user experience manager 508. In such a configuration, the connection between root visual 506 as shown in FIG. 5 to user interface manager 510 and 512 would be removed and they would instead be connected as children of user interface manager 508. Using techniques as previously described user interface manager 510 and 512 would be enabled to properly morph their experience in a seamless fashion as they are hosted under user interface manager 508.

In an alternate embodiment, system 400 may be enabled, through system analyzer and other appropriate hardware and software affordances, to create different associations of input devices 126 and output devices 130 as described in FIG. 1 to create a partitioning of the system. For example, consider a desktop computer with four input devices 126—two mice and two keyboards or the like—and two output devices 130—a computer monitor or the like—attached to it. Using these hardware and software affordances the system is able to be partitioned into two distinct collections of mouse, keyboard, and monitor. Each of these partitions would be visible to user interface host 500 through system analyzer 406. Using the affordances provided by user interface host 500 it is possible to associate a separate user experience with each of these partitions. For example, user interface host 500 may associate user interface 508 with the first partition and user interface 510 with the second partition thus allowing one or more users to interact with the user interfaces simultaneously.

In each of these examples described herein, an environment can be created in which user interface host 500 can show user experience 508 and 510 simultaneously in these configurations, which may not be different than that required to show user experience 508 and 510 in a mutually exclusive fashion. Through the use of user interface managers and user interface generator the burden of creating and managing the complexity of these scenarios has been significantly simplified effectively allowing for the re-use of an entire system user experience as a component in a much larger overall experience. It is further appreciated that the examples used herein are not limiting on any form or function. In an alternate embodiment user interface managers 508, 510, and 512 may represent different distinct experiences such as a desktop experience, a gaming console experience, and a media room entertainment experience instead of all being the same experience.

Example 1

In one embodiment, a system for generating a user interface that includes a processor to detect a type of the system based on hardware components residing within the system or coupled to the system. The processor can also determine a user interface manager to execute based on the type of the system and execute the user interface manager to generate a user interface for the system, wherein the user interface manager comprises a plurality of rules to indicate a layout of the user interface.

Alternatively, or in addition, the user interface can include at least one active application and at least one visible application. Alternatively, or in addition, the type of the system comprises a mobile system, a gaming console system, an augmented reality system, a tablet system, or a desktop system. Alternatively, or in addition, the processor is to display the user interface based on at least one display characteristic corresponding to the user interface manager. Alternatively, or in addition, the user interface manager is to manage at least two subordinate user interface managers, wherein each of the at least two subordinate user interface managers is to execute a separate application. Alternatively, or in addition, the user interface manager is also to manage a shell application that is to support experiences. Alternatively, or in addition, the user interface manager is also to manage a shell experience host that is to support experiences. Alternatively, or in addition, the processor is to detect an input device is coupled to the system and generate a new user interface manager based on the input device. Alternatively, or in addition, the input device is a gaming controller and the new user interface manager is to provide a gaming console user interface. Alternatively, or in addition, the processor is to store a state of the user interface in response to transitioning from the user interface manager to the new user interface manager.

Example 2

In another embodiment described herein, a method for generating a user interface can include detecting a type of a system based on hardware components residing within the system or coupled to the system. The method can also include determining a user interface manager to execute based on the type of the system and executing the user interface manager to generate a user interface for the system, wherein the user interface manager comprises a plurality of rules to indicate a layout of the user interface.

Alternatively, or in addition, the user interface can include at least one active application and at least one visible application. Alternatively, or in addition, the type of the system comprises a mobile system, a gaming console system, an augmented reality system, a tablet system, or a desktop system. Alternatively, or in addition, the method can include displaying the user interface based on at least one display characteristic corresponding to the user interface manager. Alternatively, or in addition, the user interface manager is to manage at least two subordinate user interface managers, wherein each of the at least two subordinate user interface managers is to execute a separate application. Alternatively, or in addition, the user interface manager is also to manage a shell application that is to support experiences. Alternatively, or in addition, the user interface manager is also to manage a shell experience host that is to support experiences. Alternatively, or in addition, the method can include detecting an input device is coupled to the system and generating a new user interface manager based on the input device. Alternatively, or in addition, the input device is a gaming controller and the new user interface manager is to provide a gaming console user interface. Alternatively, or in addition, the method can include storing a state of the user interface in response to transitioning from the user interface manager to the new user interface manager.

Example 3

In yet another embodiment described herein, a system for generating a user interface can include a processor and a storage device to store a plurality of instructions that, in response to being executed by the processor, cause the processor to detect a type of the system based on hardware components residing within the system or coupled to the system and select a user interface manager from a visual tree of user interface managers to execute based on the type of the system, wherein the visual tree is to reside in a user interface host. The plurality of instructions can also cause the processor to execute the selected user interface manager to generate a user interface for the system, wherein the selected user interface manager comprises a plurality of rules to indicate a layout of the user interface.

Alternatively, or in addition, the user interface can include at least one active application and at least one visible application. Alternatively, or in addition, the type of the system comprises a mobile system, a gaming console system, an augmented reality system, a tablet system, or a desktop system. Alternatively, or in addition, the plurality of instructions can cause the processor to display the user interface based on at least one display characteristic corresponding to the user interface manager. Alternatively, or in addition, the user interface manager is to manage at least two subordinate user interface managers, wherein each of the at least two subordinate user interface managers is to execute a separate application. Alternatively, or in addition, the user interface manager is also to manage a shell application that is to support experiences. Alternatively, or in addition, the user interface manager is also to manage a shell experience host that is to support experiences. Alternatively, or in addition, the plurality of instructions can cause the processor to detect an input device is coupled to the system and generate a new user interface manager based on the input device. Alternatively, or in addition, the input device is a gaming controller and the new user interface manager is to provide a gaming console user interface. Alternatively, or in addition, the plurality of instructions can cause the processor to store a state of the user interface in response to transitioning from the user interface manager to the new user interface manager.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system for generating user interfaces, comprising:
a processor; and
memory storing instructions that, when executed by the processor, cause the system to perform operations comprising:
generating, by a first user interface manager, a first user interface to express a first desktop experience;
receiving an association of the first user interface manager with a first project;
generating, by a second user interface manager, a second user interface to express a second desktop experience;
receiving an association of the second user interface manager with a second project;
concurrently displaying the first user interface and the second user interface to allow interaction with the first desktop experience and the second desktop experience concurrently;
detecting a change in hardware of the system; and
in response to detecting the change in the hardware of the system, morphing the display of the first user interface into a display of a third user interface, wherein morphing the display of the first user interface into the display of the third user interface includes changing a layout of the first user interface, and wherein the third user interface is concurrently displayed with the second user interface.

2. The system of claim 1, wherein the operations further comprise hosting the second user interface manager inside the first user interface manager.

3. The system of claim 2, wherein hosting the second user interface manager inside the first user interface manager includes displaying the second user interface as an overlapped window with the first user interface.

4. The system of claim 1, wherein the operations further comprise:
generating, by a fourth user interface manager, a fourth user interface; and
receiving an association of the fourth user interface manager with a third project.

5. The system of claim 4, wherein the operations further comprise concurrently displaying the fourth user interface with the third user interface and the second user interface.

6. The system of claim 1, wherein the operations further comprise:
generating a first partition of a first subset of hardware of the system;
generating a second partition of a second subset of hardware of the system;
assigning the first partition to the first user interface manager; and
assigning the second partition to the second user interface manager.

7. The system of claim 6, wherein the first subset of hardware includes a first input device and the second subset of hardware includes a second input device.

8. The system of claim 7, wherein, while the first user interface and the second user interface are concurrently displayed, interactions with the first input device are received by the first user interface manager and interactions with the second input device are received by the second user interface manager.

9. The system of claim 7, wherein the first subset of hardware includes a first output device and the second subset of hardware includes a second output device.

10. A method for generating user interfaces, comprising:
generating, by a first user interface manager of a computing device, a first user interface to express a desktop experience;
receiving an association of the first user interface manager with a first project;
generating, by a second user interface manager of the computing device, a second user interface to express a gaming console experience;
receiving an association of the second user interface manager with a second project; and
concurrently displaying the first user interface and the second user interface to allow interaction with the desktop experience and the gaming console experience concurrently;
generating, by a third user interface manager of the computing device, a third user interface;
receiving an association of the third user interface manager with a third project; and
morphing from the second user interface to the third user interface, wherein morphing from the second user interface to the third user interface includes providing a seamless visual transition from the second user interface to the third user interface using animation.

11. The method of claim 10, further comprising hosting the second user interface manager inside the first user interface manager.

12. The method of claim 11, wherein hosting the second user interface manager inside the first user interface manager includes displaying the second user interface as an overlapped window with the first user interface.

13. The method of claim 10, further comprising concurrently displaying the third user interface with the first user interface.

14. The method of claim 10, further comprising:
generating a first partition of a first subset of hardware;
generating a second partition of a second subset of hardware;
assigning the first partition to the first user interface manager; and
assigning the second partition to the second user interface manager.

15. The method of claim 14, wherein the first subset of hardware includes a first input device and the second subset of hardware includes a second input device.

16. The method of claim 15, wherein, while the first user interface and the second user interface are concurrently displayed, interactions with the first input device are received by the first user interface manager and interactions with the second input device are received by the second user interface manager.

17. The method of claim 15, wherein the first subset of hardware includes a first output device and the second subset of hardware includes a second output device.

18. A computer-implemented method of generating user interfaces on a computing system, the method comprising:
generating, by a first user interface manager, a first user interface to express a first desktop experience;
receiving an association of the first user interface manager with a first project;
generating, by a second user interface manager, a second user interface to express a second desktop experience;
receiving an association of the second user interface manager with a second project;

concurrently displaying the first user interface and the second user interface to allow interaction with the first desktop experience and the second desktop experience concurrently;

detecting a change in hardware of the system; and in response to detecting the change in the hardware of the system, morphing the display of the first user interface into a display of a third user interface, wherein morphing the display of the first user interface into the display of the third user interface includes changing a layout of the first user interface, and wherein the third user interface is concurrently displayed with the second user interface.

19. The method of claim 18, wherein the method further comprises hosting the second user interface manager inside the first user interface manager.

20. The method of claim 19, wherein hosting the second user interface manager inside the first user interface manager includes displaying the second user interface as an overlapped window with the first user interface.

* * * * *